United States Patent [19]

Huang

[11] Patent Number: 5,263,674

[45] Date of Patent: Nov. 23, 1993

[54] VALVE DEVICE FOR PERMITTING TWO OPPOSITE DIRECTION FLOWS AT DIFFERENT RATES

[75] Inventor: Yi-Fa Huang, Chiayi, Taiwan

[73] Assignee: Lee Wang Industry Ltd., Chiayi Hsien, Taiwan

[21] Appl. No.: 936,139

[22] Filed: Aug. 27, 1992

[51] Int. Cl.⁵ .............................................. F16M 11/00
[52] U.S. Cl. .................................. 248/161; 248/630; 248/622; 267/64.12; 188/300
[58] Field of Search .............. 248/575, 161, 592, 599, 248/602, 622, 157, 631; 297/345, 338; 267/64.12, 131; 188/300; 137/513.3

[56] References Cited

U.S. PATENT DOCUMENTS

| 407,981 | 7/1889 | Williams | 137/513.3 |
|---|---|---|---|
| 1,048,146 | 12/1912 | Gibbs | 137/513.3 X |
| 2,872,962 | 2/1959 | Laurent | 137/513.3 X |
| 3,057,004 | 10/1962 | Sogoian | 137/513.3 X |
| 4,113,220 | 9/1978 | Godwin et al. | 248/566 |
| 4,245,826 | 1/1981 | Wirges | 297/345 X |
| 4,257,582 | 3/1981 | Wirges | 248/406.1 X |
| 4,720,068 | 1/1988 | Tornero | 248/161 |
| 5,097,928 | 3/1992 | Enders et al. | 188/300 |

FOREIGN PATENT DOCUMENTS

| 1529716 | 5/1969 | Fed. Rep. of Germany | 248/631 |
|---|---|---|---|
| 1554479 | 1/1970 | Fed. Rep. of Germany | 248/161 |
| 76171 | 8/1961 | France | 137/513.3 |
| 2287191 | 5/1976 | France | 248/161 |
| 0112041 | 4/1989 | Japan | 188/300 |

Primary Examiner—Karen J. Chotkowski
Attorney, Agent, or Firm—Harness, Dickey & Pierce

[57] ABSTRACT

A valve device for permitting a fluid to flow in two opposite directions at different rates includes an orifice body confining a flow passage. The orifice body has one end defining a valve seat. A valve member is swingingly mounted to the housing to move toward and away from the valve seat. The valve member has a hole with a cross-section smaller than that of the flow passage whereby the flow of the fluid is large when the valve member moves away from the valve seat and is small when the valve member moves toward and seats against the valve seat.

1 Claim, 5 Drawing Sheets

VALVE DEVICE FOR PERMITTING TWO OPPOSITE DIRECTION FLOWS AT DIFFERENT RATES

BACKGROUND OF THE INVENTION

1. Field of the Invention

The present invention relates to a valve device, more particularly to a valve device which is intrinsically constructed with a simple configuration and permits a fluid to flow in two opposite directions at different rates without using manual operation or electric power.

2. Brief Description of the Prior Art

There has been a variety of valve constructions in the art designed for different purposes such as flowrate control, open-and-close operation, selection of flow directions or limiting of a fluid to flow in only one direction without reversal of flow. The configurations of the valves in the art may be either simple or complicated. Also, the operation or control of a valve is generally accomplished by means of manual labor or electric power.

As an example, a valve (1) commonly used in a flow passage (2) to limit a fluid to flow in only one direction and to prevent reversal of flow is shown in FIG. 1, which permits a fluid flow therethrough from the right-hand side along the direction of arrow (A) and prevents the fluid from flowing in opposite direction as directed by arrow (B).

However, in some applications, it is desired to use a valve which allows a fluid to flow reversibly with different limitations. Such is the case when a valve is employed in a cushion device of a chair wherein the cushion device which utilizes a pneumatic system is required to provide the seat of the chair with a function which allows the seat to be lowered smoothly as a person sits down thereon and to be raised immediately and automatically as the person leave the seat. In order to achieve this purpose without contributing any complexity in the configuration, purpose which can permit the fluid of the pneumatic system to flow in two opposite directions at different rates is desirable.

SUMMARY OF THE INVENTION

It is therefore the main object of the present invention to provide a valve device which permits a fluid to flow in two opposite directions at different rates without using manual operation or electric power.

Therefore, according to the present invention, a valve device for permitting a fluid to flow in two opposite directions at different rates comprises an orifice body confines a flow passage, the orifice body having one end defining a valve seat, and a valve member swingingly mounted to the orifice body to move toward and away from the valve seat, the valve member having a hole with a cross-section smaller than that of the flow passage, whereby the flow of the fluid is large when the valve member moves away from the valve seat and is small when the valve member moves toward and seats against the valve seat.

BRIEF DESCRIPTION OF THE DRAWINGS

Other features and advantages of the present invention will be fully understood from the following detailed description of several preferred embodiments of the present invention with the accompanying drawings, wherein.

DETAILED DESCRIPTION OF THE PREFERRED EMBODIMENT

Figure 1:
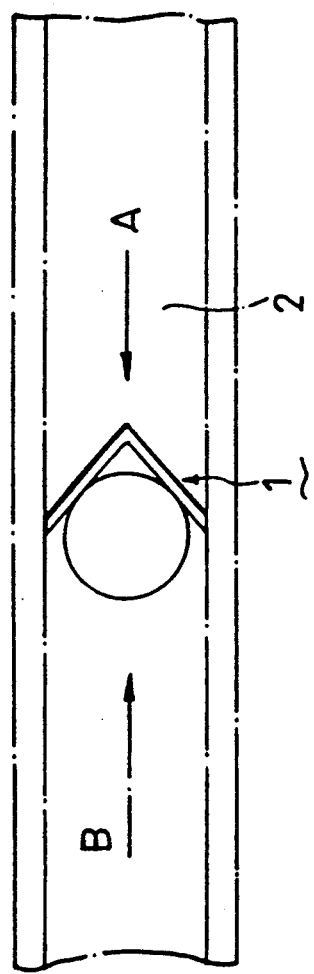
FIG. 1 illustrates a valve known in the art used to limit a fluid to flow in only one direction and to prevent reversal of flow.
Figure 2:
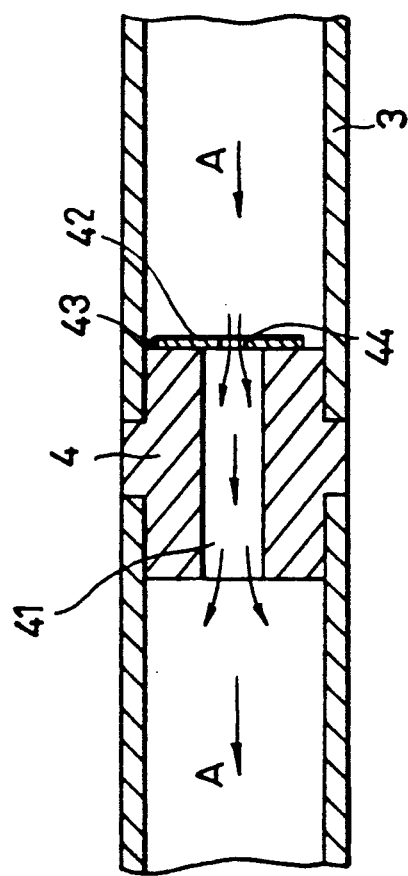
FIG. 2 illustrates a pipe incorporating a preferred embodiment of the valve device of the present invention, showing a fluid flowing through the valve device in one direction.
Figure 3:
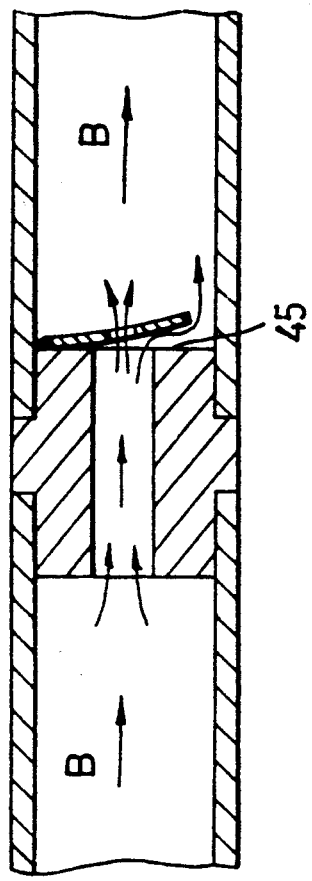
FIG. 3 shows the fluid flowing in another direction.

FIGS. 2 and 3 show a preferred embodiment of the valve of the present invention. According to the present invention, a valve device comprises a valve housing (3) which has two ports for inlet and outlet of a fluid. An orifice body (4) is formed in the valve housing (3) to confine a flow passage (41) between the two ports. The orifice body (4) also has one end defining a valve seat (45).

A valve member (42) has an edge portion (43) swingingly mounted to the orifice body (4). This allows the valve member (42) to move toward or away from the valve seat (45). The valve member (42) has a hole (44) with a cross-section smaller than that of the flow passage (41).

By such arrangement, when the fluid flows in the direction indicated by the arrow (A) in FIG. 2, the valve member (42) will be forced to move toward and seat against the valve seat (45). The flow rate of the fluid is therefore limited by the hole (44) of the valve member (42). Alternatively, if the flow direction of the fluid is opposite, as indicated by the arrow (B) in FIG. 3, the rushing fluid will forcefully urge the valve member (42) to move away from the valve seat (45). Thus, the fluid can flow not only through the hole (44) of the valve member (42), but also through the gap between the valve member and the valve seat (45). It is apparent that the flow rate of the fluid flowing in the direction of the arrow (A) is lower than that of the fluid flowing in the direction of the arrow (B) when the speeds of the fluid in both directions are the same.

Figure 4:
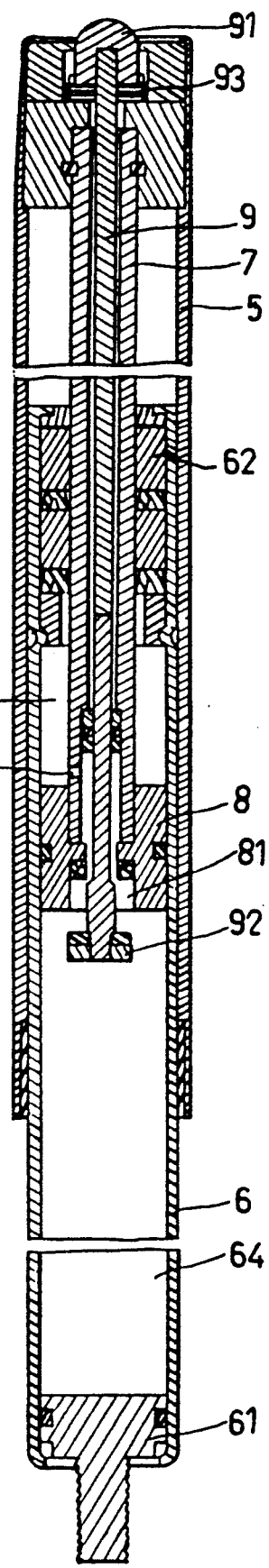
FIG. 4 shows a fluid actuated telescopic device which utilizes the preferred embodiment shown in FIG. 2.
Figure 5:
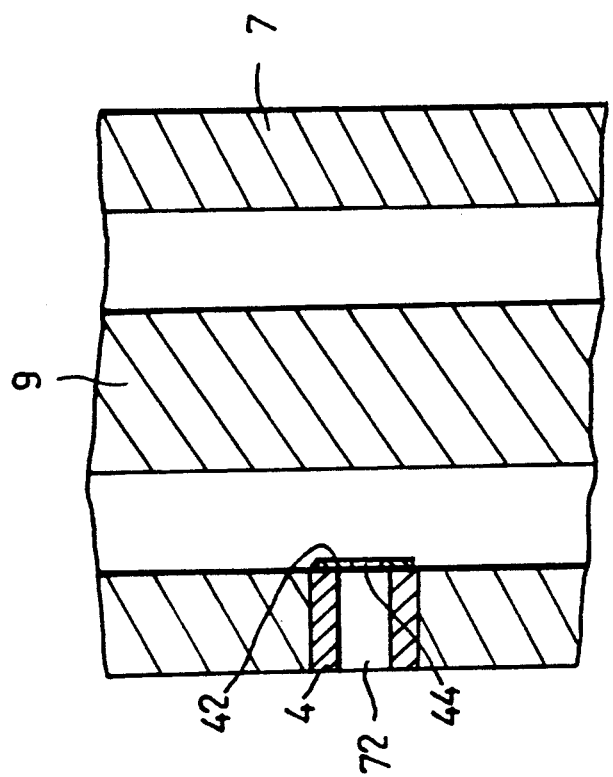
FIG. 5 is an enlarged fragmentary view of the fluid-actuated telescopic device in FIG. 4.

The preferred embodiment of the valve device of the present invention described above is applicable to a fluid-actuated telescopic device used to control a seat as shown in FIGS. 4 and 5. The prior fluid-actuated telescopic device which does not utilize the valve device of the present invention has been disclosed in the applicant's copending patent application of U.S. Ser. No. 07/811,177 filed Dec. 19, 1991 and now abandoned.

As can be seen from FIG. 4 of the drawings, the fluid actuated telescopic device includes a first tube (6) for containing a pressurized fluid such as nitrogen gas and a second tube (5) telescopically connected to the first tube (6). A piston (8) is mounted in the first tube (6) to divide said tube into first and second chambers (63, 64). In the beginning, the first chamber (63) contains substantially no fluid, while the second chamber (64) is filled with a pressurized fluid.

Seal members (61, 62) are stuffed at both bottom and top portions of the first tube (6) to prevent the fluid in the first and second chambers (63, 64) from leaking out.

A hollow piston rod (7) has one end passing through the first chamber (63) and connected to the piston (8).

The other end thereof extends out from the first chamber (63) and is connected to a closed end of the second tube (5) so as to operate the second tube (5). Said one end of the hollow piston rod (7) has a first opening (81) communicated with the second chamber (64). The hollow piston rod (7) further has a second opening (72) communicated with the first chamber (63) thereby providing a passage between the first and second chambers.

Moreover, a first valve member (92) is provided at said one end of the piston rod (7) and mounted to one end of a push rod (9) which passes through the inner space of the hollow piston rod (7) and extends out to attach to a press button (91) which cooperates with a resilient member (93) so that the push rod (9) can control the first valve member (92) to close and open said first opening (81) and to permit the fluid to flow in a first direction from the first chamber (63) to the second chamber (64) and in a second direction from the second chamber (64) to the first chamber (63).

The fluid-actuated telescopic device is characterized in that an orifice body (4) of a valve device of the present invention is disposed in the second opening (72), as shown in FIG. 5, to change the flow rate of the fluid when changing the direction thereof thereby enabling the second tube (5) to stretch out and contract at different rates.

It should be noted that the device in FIG. 4 is employed in a seat of a chair by connecting the top of the telescopic device to the seat. To actuate the device shown in FIG. 4, the press button (91) is pressed down and compresses the resilient member (93) as a person sits down on the seat, causing the first valve member (92) to open the first opening (81). Meanwhile the second tube (5), the piston rod (7) and the piston (8) are forced to move downwardly to compress the pressurized fluid in the second chamber (64), resulting in the flow of the fluid from the second chamber (64) through the first and second openings (81, 72) into the first chamber (63). The fluid entering in the first chamber (63) continues to push the piston (8) downwardly until the movement of the second tube (5) is stopped at a predetermined height by closing the first valve member (92) via the press button (91). At this time, the pressure in the first chamber (63) is greater than that of the second chamber (64). Further details of the operation is described in the applicant's above-mentioned copending patent application.

When the user wishes to leave the seat, he needs only to press the press button (91) again. This will open the valve (92), allowing the pressurized fluid in the first chamber (63) to flow back to the second chamber (64) through the second and first openings (72, 81), causing the piston (8) to move upwardly and raise the second tube (5). Because of the effect of the valve device of the invention being arranged at the second opening (72), the fluid will flow at a flowrate higher than when it flows from the second chamber (64) to the first chamber (63). Therefore, the fluid-actuated telescopic device in cooperation with the valve device of the present invention can allow the seat thereof to lower gently as a person sits down thereon and to rise rapidly as the person gets up therefrom.

It will be readily understood that modification to the preferred embodiments of the device of the invention described above would be obvious to anyone skilled in the art without departing from the scope of the appended claims.

What is claimed is:

1. A fluid actuated telescopic device including
   a first tube for containing a fluid, a second tube telescopically connected to said first tube,
   a piston mounted in said first tube to divide said tube into a first and second chamber,
   a hollow piston rod having one end passing through said first chamber and connected to said piston and having the other end extending out from said first chamber and connected to said second tube so as to operate said second tube, said one end of said hollow piston rod having a first opening communicated with said second chamber, said hollow piston rod further having a second opening communicated with said first chamber thereby providing a passage between said first and second chambers, and
   a first valve member provided at said one end of said piston rod to close and open said first opening and being operable to permit the fluid to flow in a first direction from said first chamber to said second chamber and in a second direction from said second chamber to said first chamber,
   said fluid actuated telescopic device being characterized in that a valve device is disposed in said second opening to change the flow rate of the fluid when changing the direction thereof thereby enabling said second tube to stretch out and contract at different rates.

* * * * *